US006941515B1

(12) United States Patent
Wilkins

(10) Patent No.: US 6,941,515 B1
(45) Date of Patent: Sep. 6, 2005

(54) METHOD AND APPARATUS FOR CONTROLLING A GRAPHICS ENGINE

(75) Inventor: David Wilkins, Dollard des Ormeaux (CA)

(73) Assignee: VertigoXmedia Inc., Montreal (CA)

( * ) Notice: Subject to any disclaimer, the term of this patent is extended or adjusted under 35 U.S.C. 154(b) by 0 days.

(21) Appl. No.: 09/387,502

(22) Filed: Sep. 1, 1999

(51) Int. Cl.[7] .............................. G06F 3/00; G06F 3/14; G06T 11/60; H04N 5/445; H04N 9/74
(52) U.S. Cl. ....................... 715/719; 715/717; 715/722; 715/723; 715/730; 715/731
(58) Field of Search ................................ 715/717–719, 715/722, 723, 726, 730, 731, 763, 780, 809, 500–501.1, 513–515; 725/37, 145, 146; 707/500, 500.1, 501.1, 513–515; 345/717–719, 722, 726, 730–731, 763, 780, 809

(56) References Cited

U.S. PATENT DOCUMENTS

| | | | | | |
|---|---|---|---|---|---|
| 5,592,602 | A | * | 1/1997 | Edmunds et al. ..... | 707/500.1 X |
| 5,675,752 | A | * | 10/1997 | Scott et al. .......... | 707/500.1 X |
| 5,930,808 | A | * | 7/1999 | Yamanaka et al. ....... | 707/501.1 |
| 6,034,739 | A | * | 3/2000 | Rohlfing et al. ............ | 348/586 |
| 6,081,262 | A | * | 6/2000 | Gill et al. ................. | 707/501.1 |
| 6,195,097 | B1 | * | 2/2001 | Shrader et al. ............. | 345/804 |
| 6,268,849 | B1 | * | 7/2001 | Boyer et al. ................... | 725/40 |
| 6,275,829 | B1 | * | 8/2001 | Angiulo et al. .......... | 707/104.1 |
| 6,507,362 | B1 | * | 1/2003 | Akerib ....................... | 725/109 |
| 6,701,524 | B1 | * | 3/2004 | Okamura et al. ............. | 725/37 |
| 6,754,905 | B2 | * | 6/2004 | Gordon et al. ................ | 725/38 |

OTHER PUBLICATIONS

Compton et al, "A Digital Video News Magazine and Library" 1995, IEEE, p. 296–301.*
Shrimpton et al, "Towards the Convergence of Interactive Television and WWW" 1999, IEEE, p. 1–6.*

* cited by examiner

Primary Examiner—X. L. Bautista
(74) Attorney, Agent, or Firm—Kevin Pillay; Gowling Lafleur Henderson LLP

(57) ABSTRACT

The invention relates to method and apparatus for controlling a graphics engine, the graphics engine being suitable for creating graphics in a broadcast system. The apparatus generates a user interface allowing a user to control a graphics engine. The apparatus has a first input for receiving at least one template data element, the template data element including a graphics component and a data field component suitable for receiving an information unit. The apparatus further comprises a second input coupled to an information unit source. A processing unit coupled to the first input and second input processes the template data element and the information unit source to enter in the data field component is selected information unit to form a representation of a graphics page that results from a combination of the template data element and the selected information unit. The processing unit then generates a set of commands based on the representation of the graphics page, the set of commands being executable by the graphics engine to create an on-air graphics page in the television broadcast system. This invention is particularly useful in television broadcast systems and Internet broadcast systems. The invention also provides a computer readable storage medium containing a program element for implementing the apparatus for controlling a graphics engine.

30 Claims, 8 Drawing Sheets

METHOD AND APPARATUS FOR CONTROLLING A GRAPHICS ENGINE

FIELD OF THE INVENTION

This invention relates to a method and apparatus for controlling a graphics engine. It is particularly applicable to television broadcast systems as may be used in real-time television broadcasts and Internet broadcasts to allow sending live information to the broadcast units.

BACKGROUND

It is known in the art to create graphical images for use in a television broadcast system. Typically, such graphical images are generated by sophisticated computerized graphics tools used by skilled technicians. Each image to be displayed in the television broadcast system is individually created. As a specific example, consider a news network that broadcasts election results as the are compiled. Each change in the electron results is manually entered into the graphical images and sent to the graphics engine to be displayed on-air.

Although the use of the above described computerized graphics tools allows the user to create graphical images suitable for display by a graphics engine, they are very labor intensive requiring a considerable number of skilled man-hours for the generation and up-date of the graphical images. As a result, the costs of using such systems are high.

Consequently, there is a need in the industry to refine the process of controlling a graphics engine such as to obtain improved method and apparatus that allow a reduction in labor requirements.

SUMMARY OF THE INVENTION

In accordance with a broad aspect, the invention provides a computer readable storage medium containing a program element for execution by a computing apparatus to implement a graphical user interface for allowing a user to control a graphics engine. The graphics engine is suitable for creating graphics pages in a broadcast system. The program element is operative for implementing an input for receiving at least one template data element, the template data element including a graphics component and a data field component suitable for receiving an information unit. The program element is further operative for implementing a processing unit coupled to the input. The processing unit is operative for processing the template data element and an information unit source to enter in the data field component a selected information unit to form a representation of a graphics page that results from a combination of the template data element and the selected information unit. The processing unit is further operative for generating a set of commands based on the representation of the graphics page. The set of commands is executable by the graphics engine to create an on-air graphics page in the broadcast system. The program element is further operative for implementing an output coupled to the processing unit for releasing a signal representative of the set of commands.

In a preferred embodiment the broadcast system is a television broadcast system. In another embodiment, the broadcast system is an Internet broadcast system.

In a specific example of implementation, the template data element comprises a plurality of data field components, each data field component being suitable for receiving an information unit.

Advantageously, the invention allows automatically updating data fields in a template by providing live data feeds as information unit sources.

Another advantage of the present application is that it allows non-technical users to prepare graphical images through the user interface thereby reducing significantly the labor costs.

According to another broad aspect, the invention provides an apparatus for implementing a graphical user interface for allowing a user to control a graphics engine. The graphics engine is suitable for creating graphics in a broadcast system. The apparatus comprises a first input for receiving at least one template data element, the template data element including a graphics component and a data field component suitable for receiving an information unit; a second input for receiving an information unit source and a processing unit coupled to the first input and the second input. The processing unit is operative for processing the template data element and the information unit source to enter in the data field component a selected information unit to form a representation of a graphics page that results from a combination of the template data element and the selected information unit. The processing unit is further operative for generating a set of commands based on the representation of the graphics page, the set of commands being executable by the graphics engine to create an on-air graphics page in the broadcast system. The apparatus further comprises an output coupled to the processing unit for releasing a signal representative of the set of commands.

According to another broad aspect, the invention provides a method for allowing a user to control a graphics engine, the graphics engine being suitable for creating graphics in a broadcast system. The method comprises providing at least one template data element, the template data element including a graphics component and a data field component suitable for receiving an information unit. The method further comprises providing an information unit source and processing the template data element and the information unit source to enter in the data field component, a selected information unit to form a representation of a graphics page that results from a combination of the template data element and the selected information unit. The method further comprises generating a set of commands based on the representation of the graphics page, the set of commands being executable by the graphics engine to create an on-air graphics page in a broadcast system. The method also comprises releasing a signal representative of the set of commands.

BRIEF DESCRIPTION OF THE DRAWINGS

These and other features of the present invention will become apparent from the following detailed description considered in connection with the accompanying drawings. It is to be understood, however, that the drawings are designed for purposes of illustration only and not as a deflection of the limits of the invention for which reference should be made to the appending claims.

DETAILED DESCRIPTION

Figure 8:
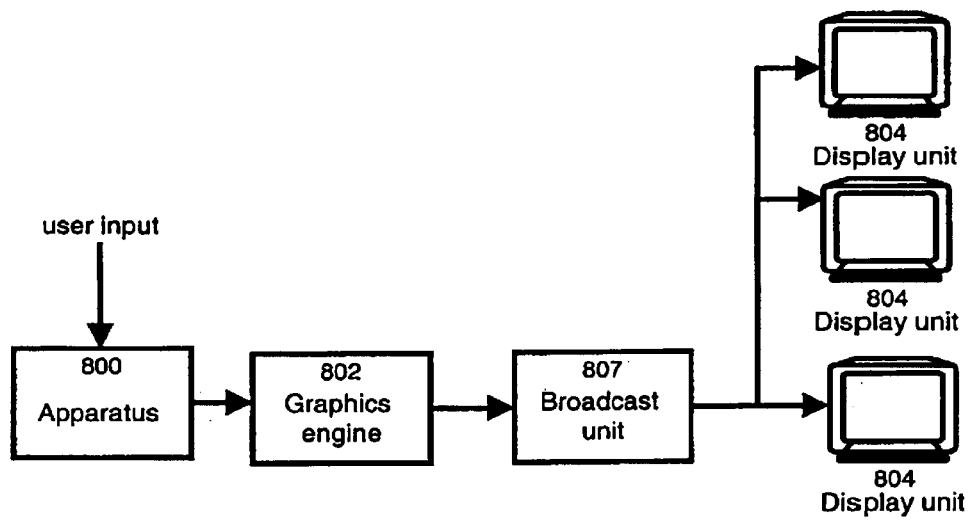
FIG. 8 shows a television broadcast system comprising an embodiment of the invention.

In the preferred embodiment, the apparatus for controlling a graphics engine in accordance with the spirit of the invention is integrated into a television broadcast system. As shown in FIG. 8, such a television broadcast system comprises an apparatus 800 in accordance with the spirit of the invention, a graphics engine 802, a broadcast unit 807 and one or more display units 804. The graphics engine 802 comprises an input for receiving a set of commands and an output for releasing data elements suitable to be broadcast to display units 804 through wireless communication, cable, satellite or other suitable communication method. In use, the input of the graphics engine is connected to a data transmission medium such as a telephone line, LAN, digital cable, optical cable, wireless transmission device or any other suitable means for receiving sets of command. The graphics engine 802 is capable of processing the set of commands received at its input to derive the image data to be released to the output for broadcasting. The graphics engine 802 is available as an off-the-shelf component. In a specific example, the graphics engine 802 is Discreet Logic's frost™, Chytron's Infinit™ or any other suitable graphics engine. The commands received at the input of the graphics engine 802 may be in any suitable data communication format such as TCP/IP and serial based commands sets. The display units 804 receive data elements broadcast by the broadcast unit 807 and display them on a screen. The display units 804 may be standard television units or alternatively may be part of a digital computing apparatus including a CPU and memory. The broadcast unit 807 comprises an input for receiving the image data output by the graphics engine 802 and broadcasts these elements to a plurality of display units 804. The broadcast unit 807 may be implemented by methods known in the art and is available as an off-the-shelf component. In another specific example, the broadcast unit 807 is substituted by a computer server suitable to be accessed by a plurality of computing units via communication channels. The apparatus 800 for controlling a graphic engine comprises an input for receiving user commands and an output for releasing sets of commands adapted to be executed by the graphics engine 802.

Figure 3:
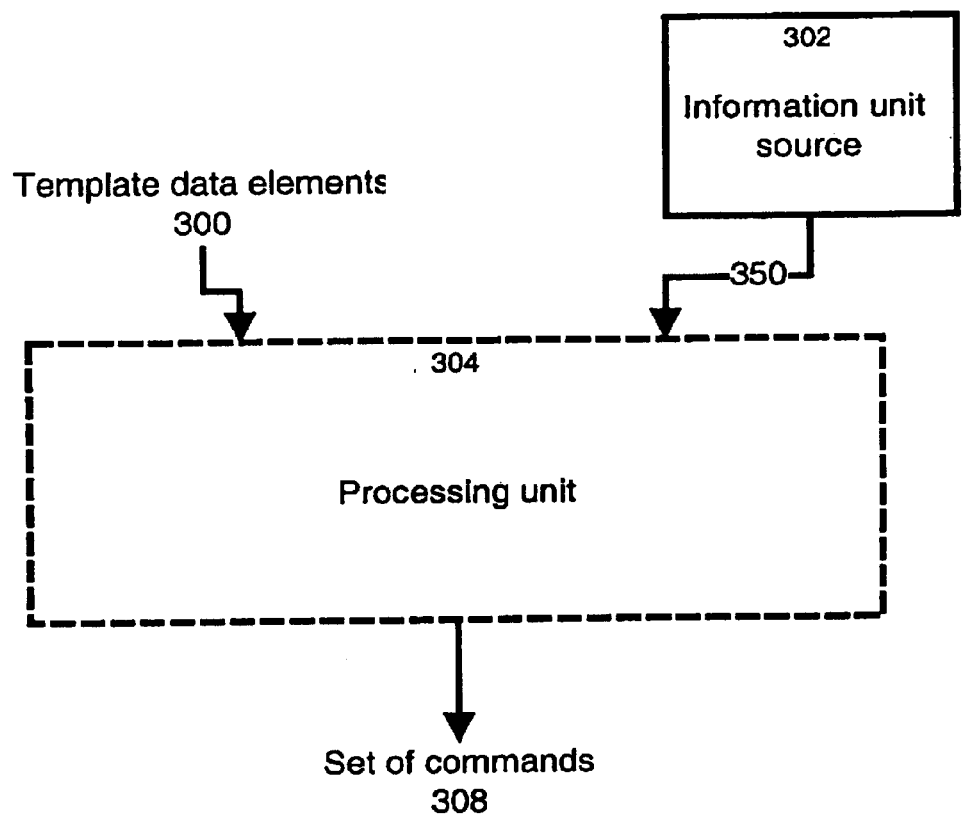
FIG. 3 shows a high level block diagram of an apparatus for allowing a user to control a graphics engine in accordance with the spirit of the invention.

A specific example of implementation of the apparatus 800 for controlling a graphics engine is shown in greater detail in FIG. 3 of the drawings. The apparatus is operative to implement a graphical user interface for allowing a user to control a graphics engine, the graphics engine being suitable for creating graphics in a television broadcast system. The apparatus comprises a first input 300 for receiving at least one template data element, a second input 350 coupled to an information unit source 302, a processing unit 304 coupled to the first input and second input to derive a set of commands and an output coupled to the processing unit for releasing a signal representative of a set of commands.

The template data element is a graphical representation of the set of commands that are sent to the graphics engine 802. More specifically, each constituent part of the template data element can be reproduced by the graphics engine by sending it a set of commands such as shape, color, position, size and other information to be drawn. The apparatus 800 imbeds in the set of commands sent to the graphics engine data such as text, drawings and real-time data. Taking the example of the display of election results, a template may contain the following constituent parts: graphics component (background, animation component); data field component #1 (text box for displaying vote count); data field component #2 (text box for displaying results); data field component #3 (image box for displaying picture of the candidate) data field component #4 (text box for displaying candidate name) and any other desirable information. When the commands corresponding to the template are sent to the graphics engine, they lack the information units. The apparatus 800 allows the user to introduce in the set of commands the information units. Optionally, at least some of the information units are received in real-time. Consequently, one template data element can be used to generate multiple on-air graphical images by introducing different information units. Continuing the example of the election results, the same template data element can be used to display the results throughout the evening by modifying the information units associated to the data components. Further, the information units can be associated to information data sources that are updated automatically by an external entity.

Figure 7:
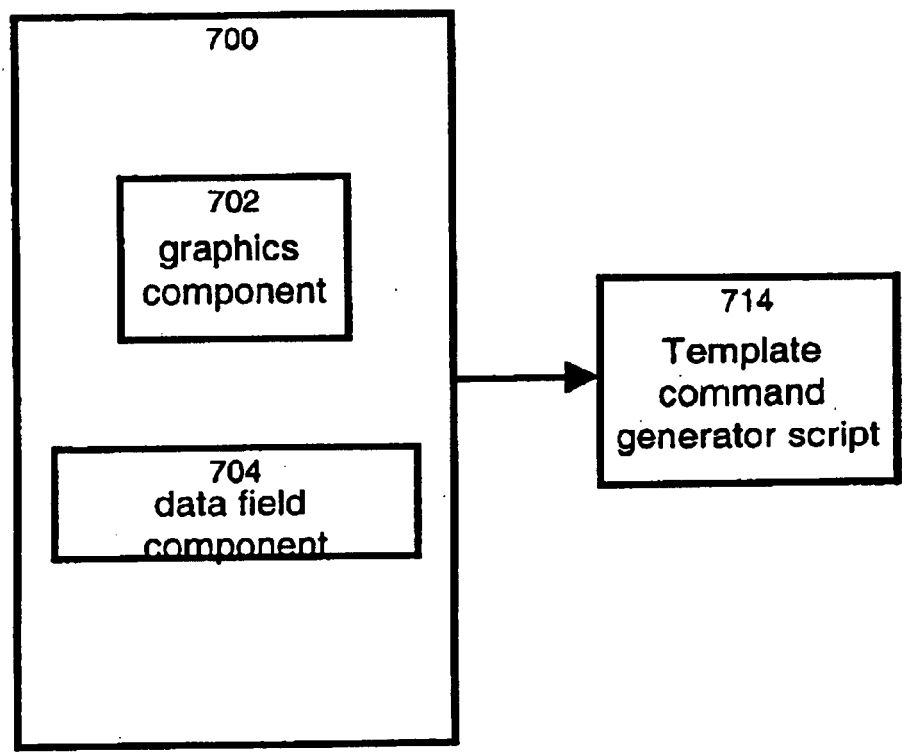
FIG. 7 shows a block diagram of an embodiment of a template data element with its constituent parts.

A high-level block diagram of a template data element is shown in FIG. 7 of the drawings. In a preferred embodiment, the template data element 700 includes a graphics component 702 and a data field component 704 suitable for receiving an information unit. The graphics component is associated to a command generator script for the graphics component providing a mapping between the graphics component and a set of commands suitable to cause the graphics engine to broadcast image data to display the graphics component. The graphics component may be generated by general-purpose graphic design tools available as of the shelf components. In a specific example, the graphics component 702 is an image stored on a computer readable medium in a graphics format such as RGB, RGBA, TIFF and TGA, for example, the graphics component may form a background that can be static or include an animation element. Other graphics format may be used here without detracting from the spirit of the invention. The data field component 704 is a graphical representation of a standard software object having certain properties and attributes. The standard software object is associated to a command generator script for the data field component allowing a mapping between the properties of the standard software object such as appearance, dimension, position, information unit and others and commands suitable for the graphics engine. In a specific example of implementation, the data field component can be associated to information unit sources via a software link. In a practical matter, this is achieved by altering a portion of the command generator script for the data field component to comprise an indication of the information unit source. This can be done manually by entering portion of the script or by the user interface providing a functionality to automatically generate a portion the script to establish the link between a data field component and an information data source when the user inputs such a request. The template data element is itself associated to a template command generator script 714 resulting from the combination of the command generator scripts for the data field components and the command generator script for the graphics component.

In a specific example, the data field component can be a text box capable of displaying text or a picture box capable of displaying a certain image.

Figure 6:
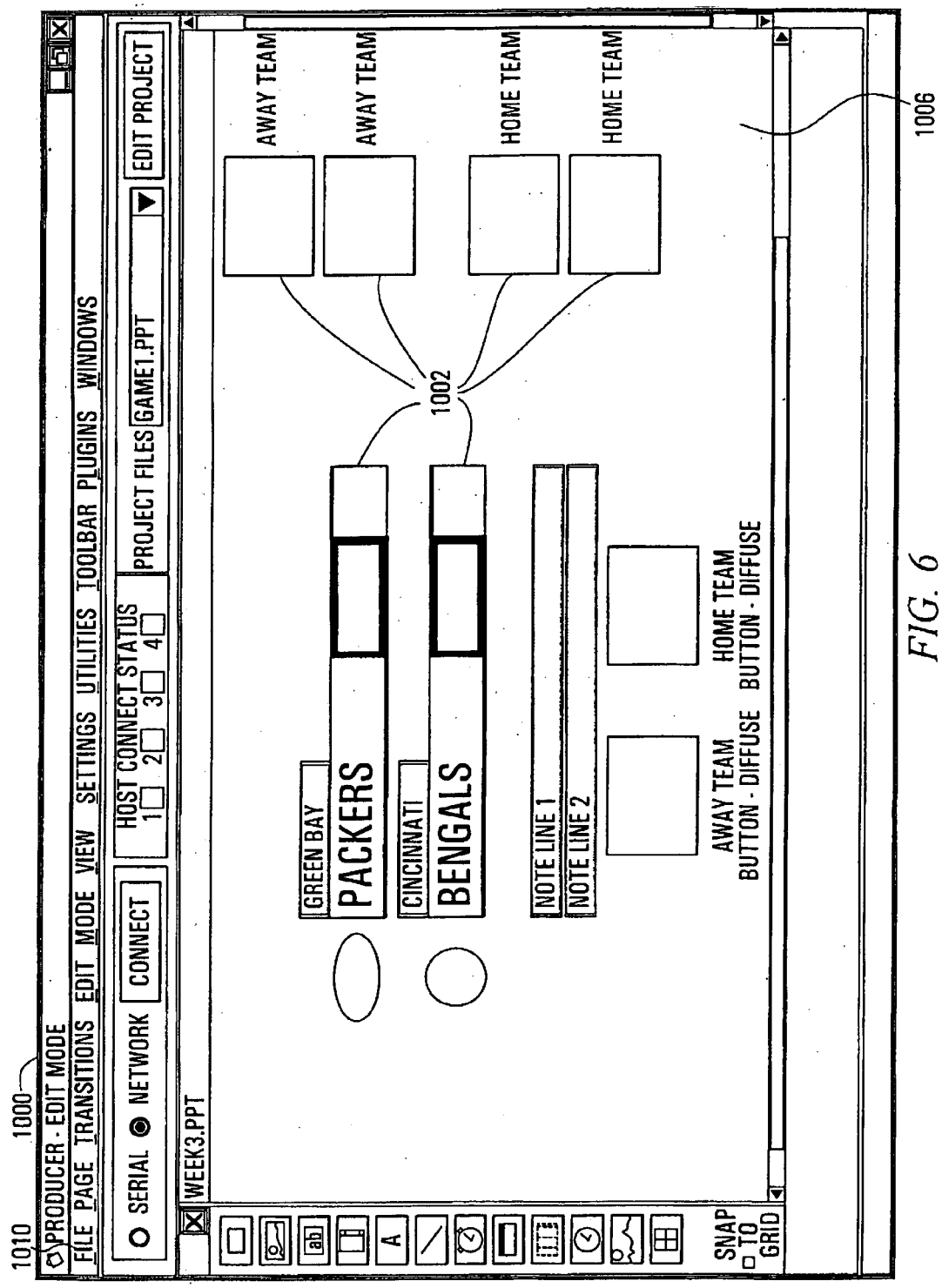

As a variant, the apparatus in accordance with the spirit of the invention may further provide a template builder unit operative to generate a template builder user interface. FIG. 6 of the drawings shows a line diagram of a specific example of a template builder user interface for a sports broadcast. The template builder user interface 1000 allows a user to create template data elements 1008. The template builder user interface 10000 may be part of the graphical user interface for allowing a user to control a graphics engine or may be a separate user interface without detracting from the spirit of the invention. In a specified example of implementation, template builder user interface 1000 allows a user to select the graphics component from a library of graphics components through a menu element 1010. The graphics component 1006 is used as the background of the graphical image. The template builder user interface 1000 further allows a user to select the data field components 1002 from a library of data field components through a menu element. In a specific element, the library of data field components comprises a plurality of standard software objects selected from a toolbox, each object being associated to a set of properties. Standard software objects may include text boxes, image boxes, graphics boxes and other types of objects suitable to be displayed on a template data element. The template builder user interface 1000 further allows the user to position the data field components 1002 on the graphics component 1006 (using drag and drop methods) as well as to resize the data field component 1002 trough the use of a pointing device or through a menu option. Software objects may be implemented in any suitable object-oriented language such as C++, Java. The use of other programming languages does not detract from the spirit of the invention.

The set of standard objects are further associated to respective command generator scripts allowing a mapping between the properties of the respective standard object such as appearance, dimension, position, data source and others and commands suitable for the graphics engine. The mapping can be achieved using a number of methods well-known in the art. In a specific example, a database associates each interaction in the command generator script to corresponding commands. In a specific example, the command generator scripts are respective to the particular type of graphics engine being controlled by the apparatus. More specifically, if the apparatus is to control several types of graphics engine using different commands, a separate command generator script is provided for each graphics engine and standard object. The graphics component 1006 is also associated to a respective command generator script allowing a mapping between the properties of the graphics component and commands suitable for the graphics engine. The template command generator script is created by combining the command generator scripts of its constituent parts. In a specific example of implementation when the apparatus operates in a multi-user environment, the template data elements 1008 generated by the template builder unit may be created and stored in a central template discovery on a network drive with a user with administrative privileges. Users having access to the network drive may then make use of the template data element to create custom graphics pages by linking a data field components and an information unit source or by adding components to the template data element. This approach is particularly advantageous for serial television productions that repeat the same graphics styles on a daily or weekly basis. The template data element 1008 may be created once only and the graphics pages for each daily production are created by simply modifying the template data element.

Advantageously, the template builder user interface 1000 allows for rapid prototyping of ready-for-air template data elements automatically mapping data elements selected graphically by the user into commands suitable for controlling the graphics engine.

The information unit source 302 provides information units to the template data element. Many types of information unit sources may be used such as databases, spreadsheets, web pages and other suitable sources of information. The information unit source 302 may be updated automatically by an external data source.

Advantageously, the linking of a data field component and an information unit source allows the user of the apparatus to quickly update graphics pages suitable for display in a television network and is particularly useful for live television broadcasts such as sports, stock trading, news and others.

The processing unit 304 is operative for processing the template data element and the information unit source to enter in the data field component a selected information unit to form a representation of a graphics page. The graphics page results from a combination of the template data element and the selected information unit. In a specific example of implementation, the selection of the information unit may be performed by the user of the apparatus by providing a functionality in the user interface which allows him to select an information unit. In another specific example, the processing unit comprises functionality that allows an automatic selection of the information unit. For example, the data field component associated to a field of a flow chart information unit source may be may be automatically updated by the processing unit when the value in the field is modified.

The processing unit 304 is further operative for generating a set of commands based on the representation of the graphics page, the set of commands being executable by the graphics engine to create an on-air graphics page in the television broadcast system. In a specific example of implementation, the processing unit is operative to execute the command generator scripts associated to the template data element in combination with the information unit. The execution of a script is known in the art to which this invention pertains. The commands generated by the execution of the command generator scripts can then be released to the output 308 of the apparatus for transmission to the graphics engine.

Figure 5:
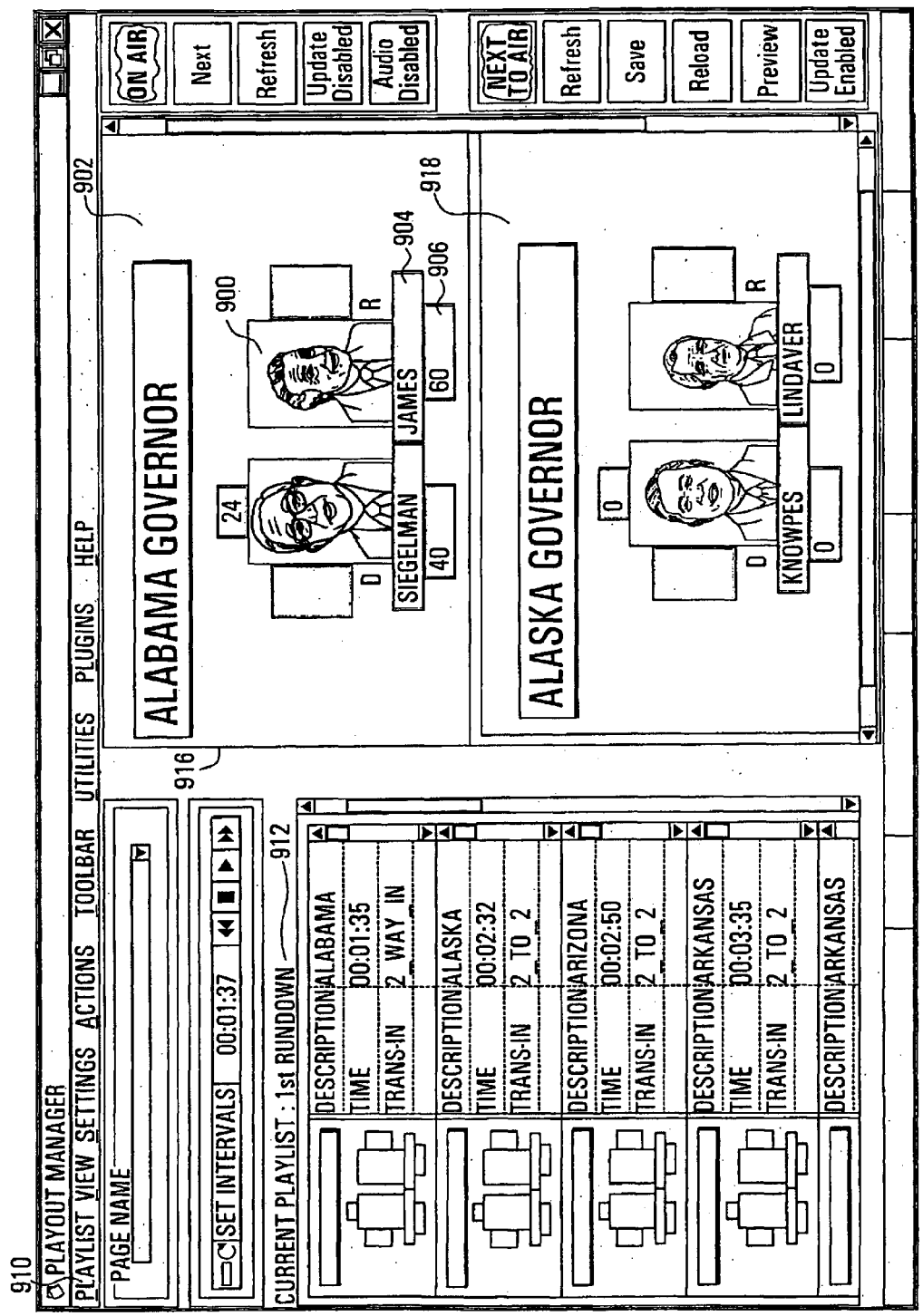
FIGS. 5 and 6 show specific examples of graphical user interfaces for allowing a user to control a graphics engine in accordance with the spirit of the invention.

In a specific example of implementation, the user interface implemented by the apparatus for controlling a graphics engine is a graphical user interface. A line diagram of a specific example of a graphical user interface in accordance with the spirit of the invention is shown in FIG. 5 of the drawings. Such an interface comprises a set of menus 910 for selecting the template data elements and the information source data elements and a display area 916 for displaying the graphics pages 902 to be sent to the graphics engine. In this specific example, the display area 916 comprises two graphics pages notably an on-air graphics page 902 and a next to air graphics page 918. Each graphics page comprises graphics component and a set of data field components 900 904 906. The data field components 900 904 906 in each graphics image display their associated information units, which in this example are text (the name of the candidate) and picture (the image of the candidate).

As a variant, the apparatus in accordance with the spirit of the invention further provides functionality allowing the user to create and organize a plurality of graphics pages and allowing the user to select an order of transmission of the sets of commands corresponding to the graphics pages to the graphics engine. In a specific example of implementation, this functionality is achieved by a play list 912 displaying a sequence of graphics pages to be sent to the graphics engine.

Figure 4:
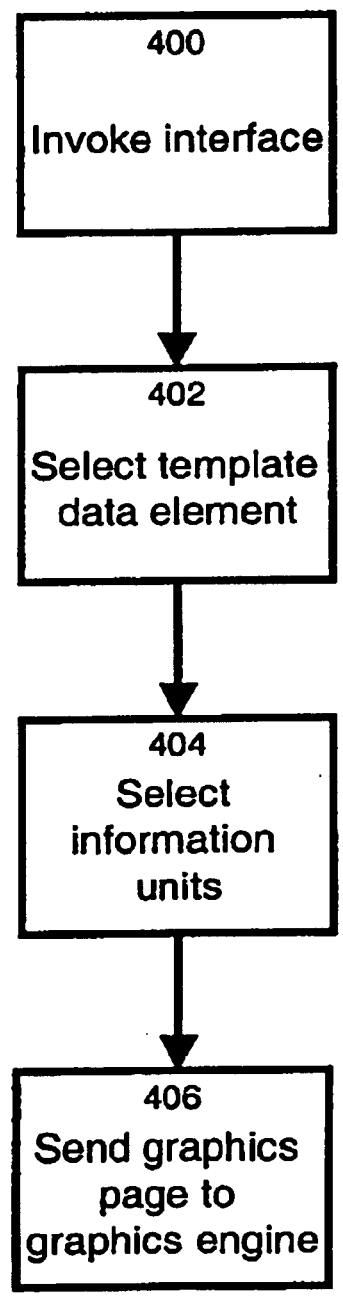
FIG. 4 shows a flow chart of a typical interaction with the apparatus depicted in FIG. 3.

In a typical interaction, as shown in FIG. 4 of the drawings, the user invokes 400 the user interface for controlling a graphics engine. Through a menu software object, the user selects 402 a template data element. Through another menu, the user then selects 404 the information unit source to be associated with the data field components of the template data element. The menu allows the system to retrieve the appropriate data source indicator element and supply it to the data field component. Alternatively, the user provides a data source indicator element identifying a given information unit source. Once the graphics page is to the satisfaction of the user, the latter may initiate the processing of the command generator scripts by instructing the apparatus to send 406 the graphics page to the graphics engine.

As a variant where the user interface provides functionality to create and organize a plurality of graphics page, the user creates each graphics page as described above (omitting step 406) and stores each page individually preferably with a graphics page identifier. In a specific example, the graphics page identifier is a sequence of alphanumeric characters. The user then selects the sequence of graphics pages he wishes to broadcast and initiates the processing of the commands generator scripts for each graphics page.

Figure 2:
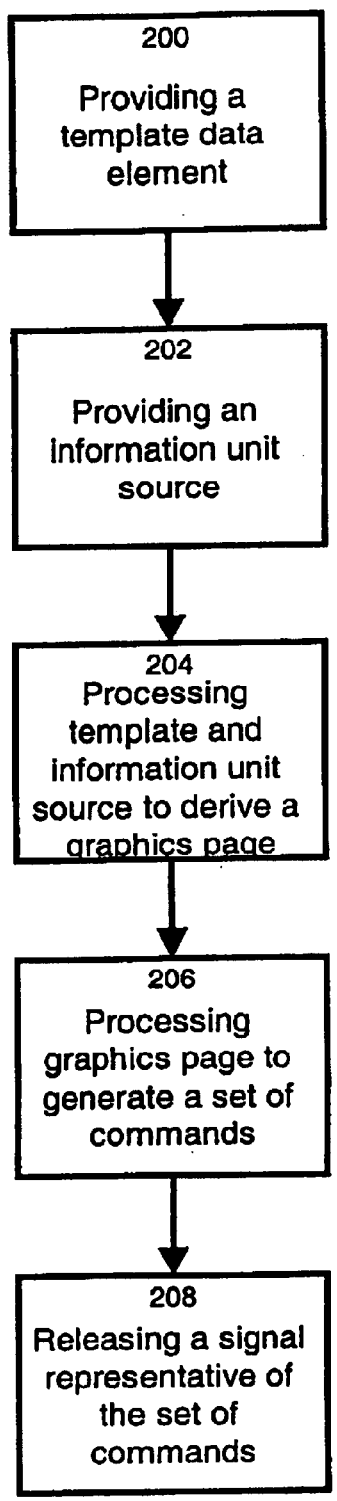
FIG. 2 shows a method allowing a user to control a graphics engine in accordance with the spirit of the invention.

The invention further provides a method for allowing a user to control a graphics engine. In a preferred embodiment, as shown in FIG. 2 of the drawings, the method comprises providing at least one template data element 200, the template data element including a graphics component and a data field component suitable for receiving an information unit. The method further comprises providing an information unit source 202 and processing 204 the template data element and the information unit source to enter in the data field component a selected information unit to form a representation of a graphics page. The graphics page results from a combination of the template data element and the selected information unit. The method further comprises generating 206 a set of commands based on the representation of the graphics page, the set of commands being executable by the graphics engine to create an on-air graphics page in the television broadcast system. A signal representative of the set of commands is then released 208 for transmission to a graphics engine.

Figure 1:
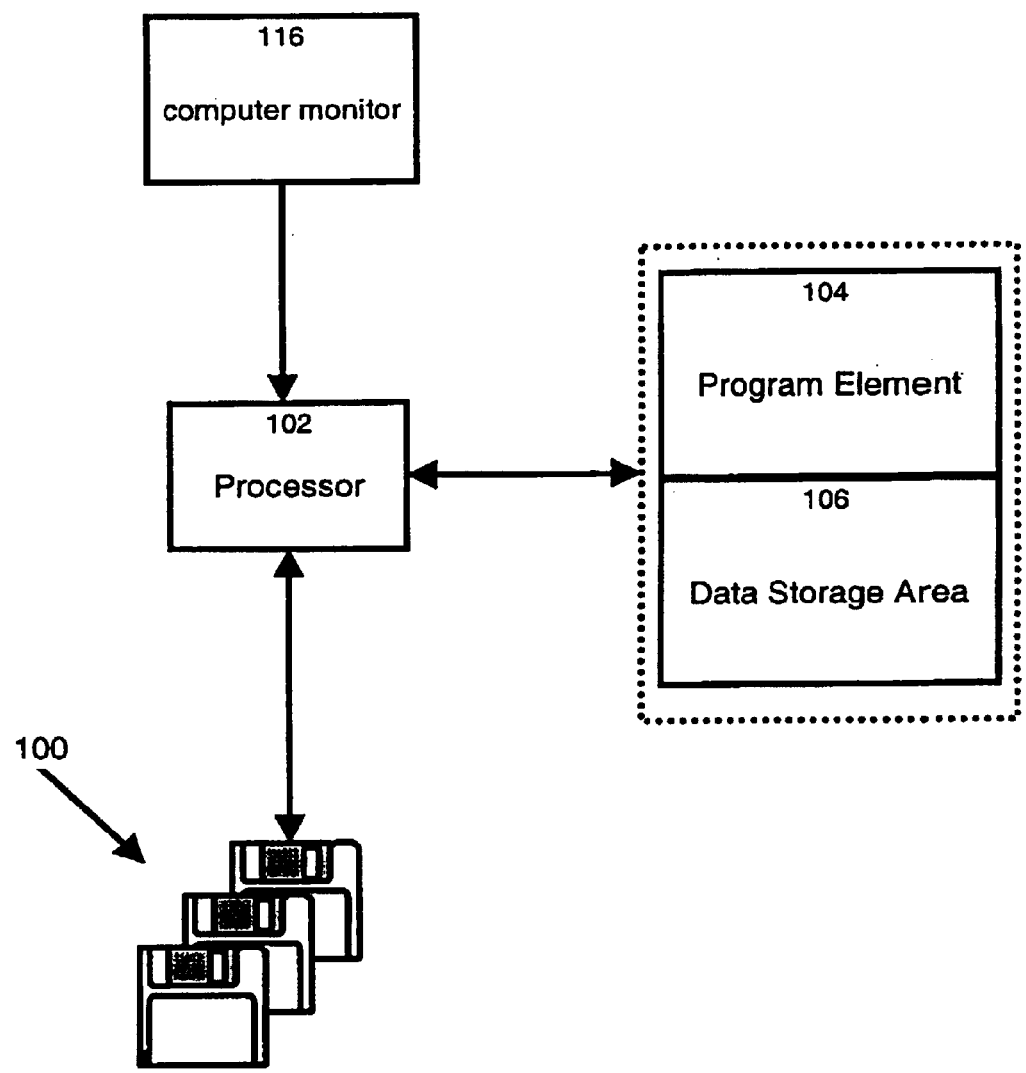
FIG. 1 shows a computer apparatus that can be used as a suitable platform to execute a program element implementing the functionality of the present invention.

The above described apparatus and method for controlling a graphics engine may be implemented on a general purpose digital computer of the type shown in FIG. 1 of the drawings. Such a general-purpose digital computer comprises a process 102 linked to a machine-readable storage element 100 that may be in the form of a mass storage device such as a hard-drive, a CD-ROM or any other suitable storage medium. The computer readable storage medium 100 contains a program element 104 for execution by a processing 102 to implement a user interface for allowing a user to control a graphics engine. The system further includes a device for visualizing the image such as a computer monitor 116 or a video screen that is operative to display the user interface implemented by the program element. The user interface allows the user to select through a touch screen, keyboard, pointing device or other input means graphical data elements and to view the combined result on the computer monitor 116. The machine-readable storage medium 100 further comprises a data storage area 106 storing data elements accessible by the program element. In a specific example of implementation, the data elements comprise template data elements and command generator scripts.

As a variant, the graphics engine is implemented in the context of a web site and is encapsulated in a program element executing on a client system. A server unit implements the method for controlling a graphics engine and transmits to the client system sets of commands allowing the client system to display the graphics pages on a display device at the client premises.

Although the present invention has been described in considerable detail with reference to certain preferred versions thereof, other versions are possible. Therefore, the spirit and scope of the appended claims should not be limited to the description of the preferred versions contained herein. The reader's attention is directed to all papers and documents which are filed concurrently with or previous to this specification in connection with this application and which are open to public inspection with this specification.

What is claimed is:

1. A computer readable storage medium containing a program element for execution by a computing apparatus to implement a user interface for allowing a user to control a graphics engine, the graphics engine being suitable for creating a graphics scene in a television broadcast system, said program element comprising:

a) an input for receiving at least one template data element for representing a television broadcast frame, the template data element including a graphics component and a data field component suitable for receiving an information unit;

b) a processing unit coupled to said input, said processing unit being operative for:

i) processing the template data element and an information unit source to enter in the data field component a selected information unit to form a representation of the graphics scene that results from a combination of the template data element and the selected information unit;

ii) generating a set of commands based on the representation of the graphics scene, the set of commands being executable by the graphics engine to create an on-air television broadcast frame; and c) an output coupled to said processing unit for releasing a signal representative of said set of commands.

2. A computer readable medium as defined in claim 1, wherein said user interface is a graphical user interface.

3. A computer readable medium as defined in claim 2, wherein said user interface is operative to receive a data source indicator element from the user, said data source indicator element being associated to the information unit source whereby allowing to establish an association between an information unit source end the data field component.

4. A computer readable storage medium as defined in claim 3, wherein said template data element comprises a plurality of data field components, each data field component being suitable for receiving an information unit.

5. A computer readable storage medium as defined in claim 2 wherein said data field component is a text box.

6. A computer readable storage medium as defined in claim 2 wherein said data field component is an image box.

7. A computer readable storage medium as defined in claim 2, wherein the information unit source is selected from the set consisting of live data feeds, databases and web pages.

8. A computer readable medium as defined in claim 2, wherein said processing unit comprises a command generator script adapted to receive information units and generate graphics components in response thereto, said graphics components being inserted into the template data element.

9. A method for allowing a user to control a graphics engine, the graphics engine being suitable for creating graphics scenes in a television broadcast system, said method comprising:
- a) providing at least one template data element for representing a television broadcast frame, the template data element including a graphics component and a data field component suitable for receiving an information unit;
- b) providing an information unit source;
- c) processing the template data element and the information unit source to enter in the data field component selected information unit to form a representation of a graphics scene in a television broadcast frame that results from a combination of the template data element and the selected information unit;
- d) generating a set of commands based on the representation of the graphics scene, the set of commands being executable by the graphics engine to create an on-air frame in the television broadcast system; and
- e) releasing a signal representative of said set of commands.

10. A method as defined in claim 9, wherein said template data element comprises a plurality of data field components, each data field component being suitable for receiving an information unit.

11. A method as defined in claim 9, wherein the information unit source is selected from the set consisting of live data feeds, databases and web pages.

12. A method as defined in claim 9, further comprising receiving a data source indicator element from the user, said data source indicator element being associated to the information unit source whereby allowing to establish an association between an information unit source and the data field component.

13. A method as defined in claim 9, wherein generating a set of commands comprises extending a script adapted to translate the template data element into said set of commands.

14. An apparatus for implementing a user interface for allowing a user to control a graphics engine, the graphics engine being suitable for creating a graphics scene in a television broadcast frame, said apparatus comprising:
- a) a first input for receiving at least one template data element for representing the television broadcast frame, the template data element including a graphics component and a data field component suitable for receiving an information unit;
- b) a second input coupled to an information unit source;
- c) a processing unit coupled to said first input and second input, said processing unit being operative for:
    - i) processing the template data element and the information unit source to enter in the data field component a selected information unit to form a representation of a graphics scene that results from a combination of the template data element and the selected information unit;
    - ii) generating a set of commands based on the representation of the graphics scene, the set of commands being executable by the graphics engine to create an on-air graphics scene in the television broadcast frame; and
- d) an output coupled to said processing unit for releasing a signal representative of said set of commands.

15. An apparatus as defined in claim 14, wherein said user interface is a graphical user interface.

16. An apparatus as defined in claim 15, wherein said template data element comprises a plurality of data field components, each data field component being suitable for receiving an information unit.

17. An apparatus as defined in claim 15, wherein the information unit source is selected from the set consisting of live data feeds, databases and web pages.

18. An apparatus as defined in claim 15, wherein said processing unit comprises a commands generator script adapted to receive information units and generate graphics components in response thereto, said graphics components being inserted into the template data element.

19. An apparatus as defined in claim 15, wherein said user interface is operative to receive a data source indicator element from the user, said data source indicator element being associated to the information unit source whereby allowing to establish an association between an information unit source and the data field component.

20. A method for controlling a graphics engine, said graphics engine being responsive to a sequence of commands received at its input, and being executable by said graphics engine to generate image data in a television broadcast frame, said sequence of commands being derived from a predefined command set of said graphics engine, said method comprising:
- a) providing a template data element for representing a television broadcast frame, the template data element including a graphics component and a data field component suitable for receiving an information unit;
- b) processing the template data element and an information unit source to enter in the data field component a selected information unit to form a representation of a television broadcast frame that results from a combination of the template data element and the selected information unit;
- c) associating said components in said representation of a television broadcast frame to commands from said graphics engine command set, to generate said sequence of commands; and
- d) outputting said sequence of commands to said graphics engine, said graphics engine responsive to said sequence of commands to generate said television broadcast frame.

21. A method as defined in claim 20, said associating being performed by executing a command generator script adapted to translate the template data element into said sequence of commands.

22. A method as defined in claim 20, further comprising providing a graphical user interface for selecting said graphics and data field components for inclusion in said template.

23. A method as defined in claim 22, further comprising forming a plurality of graphics pages executable by said graphics engine, the graphics pages having corresponding sets of sequences of commands.

24. A method as defined in claim 23, further comprising allowing a user to select an order of transmission of said sets of sequences of commands to said graphics engine.

25. A method as defined in claim 24, wherein said template data element comprises a plurality of data field components.

26. A method as defined in claim 25, wherein said information unit source is selected from a set consisting of live data feeds, databases and web pages.

27. An apparatus for controlling a graphics engine, said graphics engine being responsive to a sequence of commands received at its input, and being executable by said graphics engine to generate a graphics scene in a television broadcast frame, said sequence of commands being derived from a predetermined command set of said graphics engine, said apparatus comprising:

a) a template data element for representing a television broadcast frame, the template data element including a graphics component and a data field component suitable for receiving an information unit;

b) a processor for:
  i) processing the template data element and an information unit source to enter in the data field component a selected information unit to form a representation of a graphics page that results from a combination of the template data element and the selected information unit; and
  ii) mapping said components in said graphics page representation of a television broadcast frame to commands from said graphics engine command set, to generate said sequence of commands; and c) an output coupled to said processor for outputting said sequence of commands to said graphics engine, said graphics engine responsive to said sequence of commands to generate said television broadcast frame.

28. An apparatus as claimed in claim 27, further comprising a graphical user interface for selecting said graphics component and said data field component for inclusion in the template data element.

29. An apparatus as claimed in claim 27, wherein the processor forms representations of a plurality of graphics page.

30. An apparatus as claimed in claim 27, wherein said information unit source comprises of one of a live data feed, database, and web page.

* * * * *